UNITED STATES PATENT OFFICE.

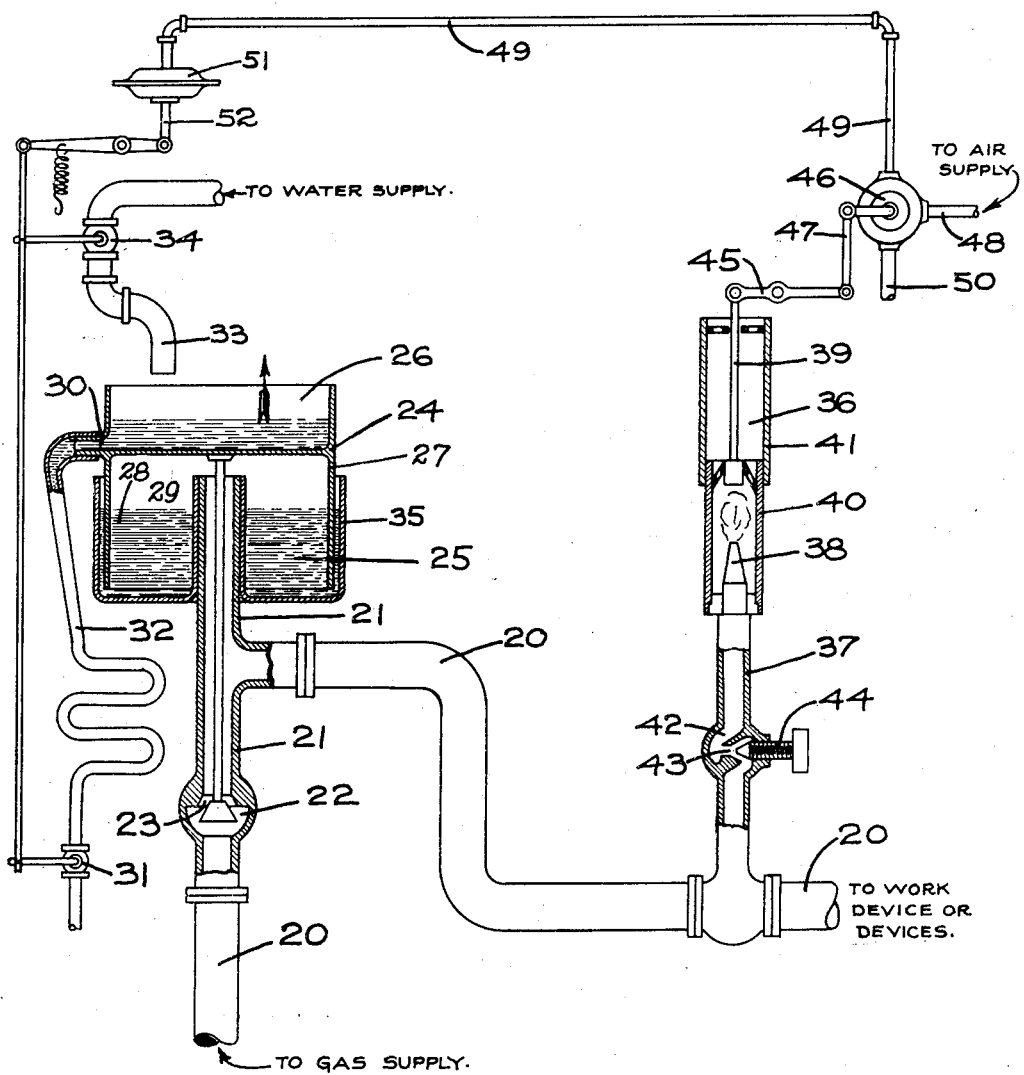

HARRY F. SMITH, OF LEXINGTON, OHIO, ASSIGNOR TO THE SMITH GAS ENGINEERING COMPANY, A CORPORATION OF OHIO.

SYSTEM OF GAS CONTROL.

1,348,379.   Specification of Letters Patent.   Patented Aug. 3, 1920.

Application filed January 22, 1917. Serial No. 143,781.

*To all whom it may concern:*

Be it known that I, HARRY F. SMITH, a citizen of the United States of America, residing at Lexington, county of Richland, and State of Ohio, have invented certain new and useful Improvements in Systems of Gas Control, of which the following is a full, clear, and exact description.

This invention relates to gas supply systems, and more particularly to devices for controlling the flow of gas in such systems.

One of the objects of the present invention is to provide a gas system, wherein the heat effect of the gas flowing through the system will be maintained substantially constant.

Another object of the present invention is to provide a gas system wherein the pressure of the gas flow may be varied in order to maintain the heating effect of the gas substantially constant.

One manner of carrying out the above mentioned objects of the present invention is to provide a gas system, wherein devices, automatically controlled by the heat values of the gas flowing through a gas main, will tend to actuate or control a pressure controlling mechanism associated with the said gas main. That is, a heat controlling device such as a thermostat, is so arranged relative to the flow of the gas that varying heat values of the gas will tend to actuate mechanism associated therewith, so that the pressure in the gas main may be either increased or decreased, and thereby tend to increase or decrease the flow of gas through the main, so that a greater or less amount of gas may pass to the work devices, to give a constant and uniform heat effect.

In gas supply systems wherein the gas passing through the main at a constant pressure is controlled by a given adjustment of supply valves, a certain amount of heat units per minute will be admitted to the furnace, so long as the pressure remains constant in the main, and the B. T. U. value of the gas also remains constant. However, if the B. T. U. value of the gas should vary while the pressure on the gas supply main remains constant, the number of heat units per minute admitted to the furnace will vary in a like manner.

In carrying out the present invention, means are therefore provided, whereby the pressure in the gas main is maintained constant only so long as the heat value of the gas per unit volume remains uniform.

If, for example, the heat value of the gas per unit volume falls, the pressure in the gas main remaining constant, there would then be fewer B. T. U.'s per minute in the work devices, and the temperature of the devices would correspondingly fall.

However, as soon as this tendency is indicated in the present invention, the devices automatically controlled by the heat values, operate upon pressure controlling means to increase the pressure in the distributing main by just such an amount as will be necessary to again bring about the discharge of the same amount of heat units per minute to the work devices, as were discharged under the initial conditions.

Further objects and advantages of the present invention will be apparent from the following description, reference being had to the accompanying drawing, wherein one preferred form of embodiment of the present invention is illustrated diagrammatically.

Referring to the drawing, one form of apparatus is illustrated for carrying out the present invention. The numeral 20 designates a supply main, connected at one end to any suitable source or supply of gas under pressure, while the other terminal of the main is connected to any suitable work device or devices, such as a furnace or bank of furnaces or engines.

The main 20 is connected to the gasometer valve casing 21, which includes the valve chamber 22 and the valve 23. The valve 23 is connected to and operated by the movable unit, or upper bell, 24 of the gasometer 25, which includes a tank, or reservoir, 26, having a depending cylindrical portion 27, adapted to slidably fit within the gasometer casing, or lower bell, 35. This casing 35 is secured to the gasometer valve casing 21 in such a manner as to make a gas tight fit therebetween.

A quantity of liquid, preferably water 28, is contained in the gasometer casing 35, thereby providing a seal which will prevent leakage of gas from the chamber 29.

The tank 26 is provided with an outlet 30, said outlet being in turn connected with the drain valve 31 by means of the flexible hose connection 32, so as to readily permit the draining of the tank 26. This liquid, which is preferably water, is supplied through the faucet 33, by operating the valve 34.

The valves 31 and 34 are governed as to their operation by the thermostat 36, which is in direct communication with the main 20, by means of the pipe 37. This thermostat 36 includes a burner element 38, and a thermostatic strip 39, mounted respectively in the casings 40 and 41. This pipe 37 is provided with a chamber 42, in which a valve 43 is mounted. The opening of the valve may be varied by means of the needle 44, which can be adjusted by the operator.

The thermostatic strip 39 is connected to the lever arm 45, which in turn is connected with the air valve 46 by means of the link connection 47. This air valve is so constructed that the link 47 may be moved into position to permit air to flow from the supply pipe 48, through the pipe 49, while the exhaust outlet 50, of the valve 46, is closed.

When the connecting link 47 is moved into the reverse or opposite position, the air supply from the pipe 48 is shut off and the pipe 49 is brought into communication with the exhaust outlet 50, thereby permitting the air in the pipe 49 to exhaust to the atmosphere.

The pipe 49, mentioned heretofore, is connected with a diaphragm valve 51, which has a stem connection 52, operatively connected to the valves 34 and 31, and adapted to move one toward closed position when the other is being opened, and vice versa.

In the drawing, the gasometer is shown in such position that it permits the gas to flow through the valve 23, thence through a continuation of the gas main 20, out to whatever work devices may be connected to the gas main. A portion of the gas will pass through the pipe 37, the amount being governed by the regulating devices 43 and 44, for controlling the flow of gas.

The gas which flows through the pipe 37 is ignited at the burner 38, and normally heats the thermostatic element 39, to a predetermined degree. Now, as soon as the heat of the burner 38 affects the thermostatic strip 39, the valve 46 will be opened a certain degree, thereby permitting the passage of a certain amount of air through the pipe 49, thus actuating the diaphragm valve 51.

The extent of the air pressure within the pipe 49, and the operation of the diaphragm valve 51, will bring the valves 34 and 31 into a normal position. This normal position is shown substantially in the drawing. That is, the valve 23 will be in such position as to readily permit a flow of gas through the gas main 20.

The apparatus shown herein is adapted for so controlling a system of gas distribution as to provide, broadly, an automatic regulation or variation in the pressure of the gas within the supply main in accordance with variations in the heat value of the gas, so that a substantially uniform heating effect is secured at the working devices.

If the gas flowing though the main 20 increases in its B. T. U. value, due to any one of a number of conditions which may exist, or which may come into existence during the operation of the system, the heat value of the flame at the burner 38 will correspondingly increase, and thereby tend to actuate the thermostatic strip in such a manner that the diaphragm valve 51 will be connected through the valve 46 and the pipes 48 and 49, to the supply of pressure air. Deformation of the diaphragm will result which will in turn actuate the valves 34 and 31, so as to cut off the flow of water through the faucet 33, and open the drain valve 31, to permit the water contained in the tank 26 to flow out through the flexible hose 32 of the drain valve 31, into any suitable connection.

As the water passes from the tank 26, the pressure of the gas on the movable element 24 of the gasometer will tend to force this movable element upwardly, in the direction of the arrow shown in the drawing, to move the valve 23 into a position more nearly closed, thus cutting down the flow of gas through the main 20, and consequently reducing the heating effect of the gas delivered through the constant valve opening of the work device.

This operation is repeated from time to time, so that it will be apparent that as the heat values of the gas vary, the operation of the thermostatic strip 39 will likewise vary, and this in turn will effect a variation in the operation of the diaphragm valve 51, and consequently a variation in the operation of the gasometer 25. That is, if the heat values or the B. T. U. values of the gas passing through the main 20 decrease below a predetermined normal value, the thermostatic strip 39, under the varied effect of the heat of the flame, will operate to cut off the flow of air from the pipe 48 to the pipe 49, and will connect the pipe 49 with the exhaust pipe 50. This will, of course, permit the air to exhaust from the pipe 49 and consequently cause the diaphragm 51 to function so as to open the valve 34, and close the valve 31, thereby tending to fill the tank 26 with water.

As the weight of the water within the tank 26 increases it will tend to depress the movable unit 24 of the gasometer 25, and thereby tend to increase the opening of the valve 23, so as to permit a greater volume of gas to pass through the pipe 20, in order to furnish a greater volume of gas to each work device.

Obviously the reverse action takes place if the heat value of the gas increases, with a consequent decrease in the quantity of gas passing through the valve 23.

As soon as the B. T. U. value of the gas is again brought to normal, the operation of the thermostat, relative to the air controlling valve 46, will again be so affected as to cut down the pressure of gas passing through the main 20 to the predetermined normal.

In the foregoing description, the term "B. T. U. values" has been used with reference to the heat values of the gas, but it will be understood that this standard has simply been adopted for convenience, and that any other standard may be used, it being merely necessary to construct the thermostat in such manner as to operate in accordance with the standard adopted.

While the form of mechanism herein shown and described constitutes a preferred form of embodiment of the invention, it is to be understood that other forms might be adopted, all coming within the scope of the claims which follow.

What I claim is as follows:

1. In a system for distributing a combustible fluid, the combination with a main adapted to convey the fluid from a source of supply to a place of use; of a valve adapted to control the flow of fluid through the main; a gasometer associated with said valve, the upper bell thereof having a fluid reservoir thereon, and being operatively connected to the stem of said valve; means for supplying a fluid to said reservoir, and other means for permitting the escape of fluid from the reservoir, pressure operated means adapted to operate each of said last named means to cause a flow of fluid to or from said reservoir; means for actuating said pressure operated means; and thermostatic means, responsive to the heat generated by burning a portion of the combustible fluid, for causing said pressure operated means to function.

2. In a system for distributing a combustible fluid, the combination with a main adapted to convey the fluid from a source of supply to a place of use; of a valve adapted to control the flow of fluid through the main; a gasometer having the upper bell thereof operatively connected to said valve, a fluid reservoir carried by said upper bell; a valve controlled inlet adapted to supply a fluid to said reservoir, a valve controlled outlet adapted to permit the escape of fluid from said reservoir, valve operating means operatively connected to both said valves and arranged to move one valve toward open position and, at the same time, to move the other valve toward closed position; pressure operated means for actuating the said valve operating means, a valve for controlling the flow of pressure fluid to said pressure operated means; a thermostatic element operatively connected to said last named valve; and a burner adjacent the thermostatic element for burning a part of the combustible fluid passing through the main, the thermostatic element being responsive to the heat generated at the burner.

In testimony whereof I affix my signature in the presence of two subscribing witnesses.

HARRY F. SMITH.

Witnesses:
CARRIE H. SMITH.
WALTER W. RIEDEL.